United States Patent [19]

Brown et al.

[11] Patent Number: 5,100,558

[45] Date of Patent: Mar. 31, 1992

[54] METHOD FOR CONTROLLING SILICA DEPOSITION IN AQUEOUS SYSTEMS

[75] Inventors: J. Michael Brown; Cato R. McDaniel, both of The Woodlands; Truc K. Nguyen, Houston, all of Tex.; Steven P. Sherwood, Denver, Colo.

[73] Assignee: Betz Laboratories, Inc, Trevose, Pa.

[21] Appl. No.: 637,092

[22] Filed: Jan. 3, 1991

[51] Int. Cl.$^5$ ................................. C02F 1/00
[52] U.S. Cl. ................... 210/699; 210/701; 252/180; 252/181
[58] Field of Search ............ 252/180, 181, 389.2, 252/389.24, 395; 210/697, 698, 699, 700, 701; 422/15, 17, 18, 19

[56] References Cited

U.S. PATENT DOCUMENTS

| | | | |
|---|---|---|---|
| 3,578,589 | 5/1971 | Hwa et al. | 210/58 |
| 3,948,792 | 4/1976 | Watsen et al. | 252/181 |
| 4,497,713 | 2/1985 | Geiger | 210/699 |
| 4,618,448 | 10/1986 | Cha et al. | 252/180 |
| 4,659,481 | 4/1987 | Chen | 210/697 |
| 4,732,698 | 3/1988 | Chen | 252/181 |
| 4,869,845 | 9/1989 | Chen | 252/181 |
| 4,900,451 | 2/1990 | Brown et al. | 252/180 |

FOREIGN PATENT DOCUMENTS 259097 2/1989 Czechoslovakia .
31894 2/1990 Japan .

OTHER PUBLICATIONS

Cooling-water treatment for control of scaling, fouling, corrosion, Strauss, Sheldon D., Power, Jun. 1984, pp. S.1-S.23.

Dubin, L. et al., Deposit Control in High Silica Water, Nalco Chemical Co., 1984.

Hansen, G. D. et al. The effect of soluble silica on cooling water program performance, Corrosion 86, pp. 400/1-400/25.

Primary Examiner—Prince Willis, Jr.
Assistant Examiner—J. Silbermann
Attorney, Agent, or Firm—Alexander D. Ricci; Gregory M. Hill

[57] ABSTRACT

A method for the inhibition of silica deposition on the surfaces of a structure which contains an aqueous medium comprising adding to the aqueous medium a composition comprising HEDP, PEG and a water soluble polymer having the structure:

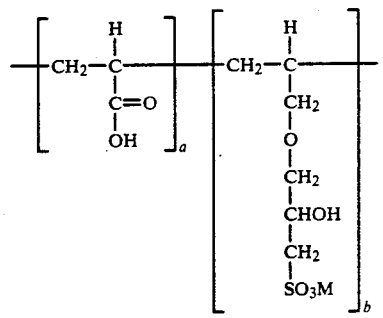

wherein M is a water soluble cation. This invention is particularly effective in cooling water and steam generating systems.

5 Claims, No Drawings

METHOD FOR CONTROLLING SILICA DEPOSITION IN AQUEOUS SYSTEMS

FIELD OF THE INVENTION

The present invention relates to cooling and boiler water systems. The control of silica deposition within these systems is the focus of the invention disclosed hereinafter.

BACKGROUND OF THE INVENTION

The problems of scale formation and its attendant effects have troubled water systems for years. For instance, scale tends to accumulate on internal walls of various water systems, such as boiler and cooling systems, thereby materially lessening the operational efficiency of the system.

One particular type of deposit, silica, has proven to be especially troublesome. This invention is directed toward those water systems where silica deposition is most problematic.

In cooling water systems, silica forms a deposit on the metal surfaces which contact the water flowing through the system. In this manner, heat transfer efficiency becomes severely impeded. This, in turn has a deliterious effect on the overall operating efficiency of the cooling water system.

Although steam generating systems are somewhat different from cooling water systems, they share a common problem in regard to deposit formation. As detailed in the Betz Handbook of Industrial Water Conditioning, 8th Edition, 1980, Betz Laboratories, Inc., Trevose, Pa. pages 85-96, the formation of scale and sludge deposits on boiler heating surfaces is a serious problem encountered in steam generation. Although current industrial steam producing systems make use of sophisticated external treatments of the boiler feedwater, e.g., coagulation, filtration, softening of water prior to its being fed into the boiler system, these operations are only moderately effective. In all cases, external treatment does not in itself provide adequate treatment since muds, sludge, silts and hardness-imparting ions, such as silica, escape the treatment, and eventually are introduced into the steam generating system. As is obvious, the deposition of silica on the structural parts of a steam generating system causes poorer circulation and lower heat transfer capacity, resulting accordingly in an overall loss in efficiency.

Various methods have been utilized for resolving the problem of sludge and silt, including silica, deposition. In U.S. Pat. No. 3,578,589, Hwa et al., inhibition of scale, mud, silt and sludge deposition is achieved by adding a nonionic surface active agent, such as a polyethyleneoxy alkyl phenol, and a water soluble polymer, such as polyacrylic acid.

In Watsen et al., U.S. Pat. No. 3,948,792, the patentees disclose the problem of silicate scale formation in automobile and diesel coolant systems. They teach adding a water soluble carboxylic acid polymer along with boric acid, or borates, and nitrites.

U.S. Pat. No. 4,869,845, Chen, utilizes the same copolymer as utilized in the present invention to treat scale and corrosion problems in cooling and boiler water systems. The copolymer is added to the system with both a phosphonate and a zinc compound. The purpose of the copolymer is to maintain the solubility of zinc. Without this mechanism, the zinc would precipitate in the form of zinc hydroxide and would be unavailable for its desired anti-corrosion activity.

DETAILED DESCRIPTION OF THE INVENTION

In accordance with the invention, it has been discovered that a treatment program comprising the water soluble copolymers, as shown in Formula I hereinafter, hydroxyethylidene diphosphonic acid and polyethylene glycol is effective in controlling the formation of silica deposits on the internal surfaces of structures housing various water systems.

FORMULA I

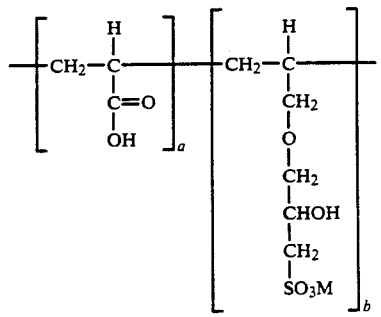

M is a water soluble cation. This polymer is referred to as acrylic acid/allyl hydroxy propyl sulfonate ether (AA/AHPSE). The IUPAC nomenclature for AHPSE is 1-propane sulfonic acid, 2-hydroxy-3-(2 propenyloxy) mono sodium salt.

The number average molecular weight of the water soluble copolymers of FORMULA I may fall within the range of 1,000 to 1,000,000. Preferably the number average molecular weight will be within the range of from about 1,500 to about 10,000 being even more highly desirable. The key criterion is that the polymer be water soluble.

The molar ratio a:b of the monomers of FORMULA I may fall within the range of between about 30:1 to 1:20, with the a:b molar ratio range of from about 10:1 to 1:5 being preferred.

With respect to both repeat units of the polymers of the present invention, they may exist in acid or water soluble salt form when used in the desired water system.

As to preparation of the monomer designated as a above, in FORMULA I, acrylic acid is well known. It may be produced by hydrolysis of acrylonitrile or via oxidation of acrolein.

Turning to the allyl containing monomer, monomer b, in FORMULA I above, it may be produced by reacting allyl alcohol with a non-tertiary alcohol in the temperature range of about 25°-150° C. as detailed in U.S. Pat. No. 2,847,477 (the entire disclosure of which is hereby incorporated by reference) followed by, if desired, sulfonation, phosphorylation, phosphonation or carboxylation of the monomer via well-known techniques.

The preferred allyl hydroxyl propyl sulfonate ether monomers (monomer b, FORMULA I) may conveniently be prepared via a ring opening reaction of the epoxy group of an allyl glycidyl ether precursor. Sulfonation of the epoxy group with sodium sulfite in the presence of a phase transfer catalyst such as tetra-n-butyl ammonium bisulfite or with fuming sulfuric acid containing sulfur trioxide will produce the sulfonic acid group and hydroxy group of the AHPSE. The resulting monomer can be further neutralized with caustic or other basic material.

The reaction is illustrated by the following mechanism:

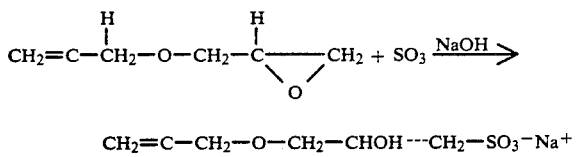

$$CH_2=C-CH_2-O-CH_2-CHOH---CH_2-SO_3^-Na^+$$

It should be noted that monomer b may itself be allyl glycidyl ether which is commercially available from several sources. Suitable cations, M, include Na+, NH$_4$+, Ca+$^2$ and K+.

After the desired monomers have been obtained, free radical chain addition polymerization may proceed in accordance with conventional solution polymerization techniques. Polymerization initiators such as persulfate initiators, peroxide initiators, etc. may be used. Preferably the requisite monomers are mixed with water and alcohol (preferably isopropanol). The resulting polymer may be isolated by well-known methods such as distillation, etc. or the polymer may simply be used in its aqueous solution.

The treatment program of the present invention comprises adding the copolymer (AA/AHPSE) previously described along with hydroxy ethylidene diphosphonic acid (HEDP) and polyethylene glycol (PEG) to the aqueous system to be treated. These compounds are added in an effective amount for the purpose, generally having a concentration range AA/AHPSE HEDP: PEG, respectively, 0.1-500 ppm: 1-100 ppm: 1-100 ppm. The relative component concentrations will vary depending upon the particular aqueous system to which the treatment is directed. Factors influencing dosages are the surface area of the heat exchange surfaces, pH, temperature, water flow rate and concentrations of potential deposit forming species.

The treatment of the present invention may be added to the aqueous system to be treated either on a continuous basis or intermittently. The separate compounds comprising the treatment program may be preblended prior to addition to the aqueous system or each compound may be added separately according to a predetermined dosage for the purpose of achieving the desired concentration level of the treatment compounds in the aqueous system.

The present invention is useful in treating silica deposition problems which exist in a broad range of aqueous systems. Silica deposition is most frequently encountered where the water contains various amounts of suspended materials such as silt, clay and organic wastes. Much of the water used in cooling systems and water cooled industrial heat exchangers is supplied from rivers, lakes, and ponds which contain these materials. Therefore, any industrial system using such water is likely to have silica deposition problems. These systems include industrial cooling water and steam generating systems.

EXAMPLES

Dynamic silica inhibition testing was conducted in non-evaporative Bench Top Recirculators which were operated in batch configuration with no makeup or blowdown streams. Treatment efficacy was determined from the appearance of the stainless steel heat transfer surfaces after 48 hours. Tests were performed by heating one surface to 150° F. and by chilling the other surface to 50° F.

Test Conditions
pH: 8.5
Sump Temperature: 120° F.
Flow Rate: 3.0 GPM
Velocity Across Heat Transfer Surface. 2.1 Ft/Sec
Sump Volume: 12 Liters
Water Matrix:
Ca+$^2$:600 ppm as CaCO$_3$
Mg+$^2$:300 ppm as CaCO$_3$
SiO$_2$:300 ppm
NaHCO$_3$:100 ppm Table I shows the results of testing treatment programs with varied component dosages to show the efficacy of the present invention.

TABLE I

SCALE INHIBITION
AA/AHPSE:HEDP:PEG

| Sample | AA/AHPSE (active) | HEDP | PEG | Deposition 150° F. | 50° F. |
|---|---|---|---|---|---|
| Control | (5 ppm 2-phosphonobutane-1,2,4-tricarboxylic acid) | | | heavy | heavy |
| A | — | 5 | — | heavy | heavy |
| B | — | 5 | 10 | moderate/heavy | light/moderate |
| C | 50 | 5 | 20 | v. light/light | light |
| D | 50 | 5 | 50 | light | heavy |
| E | 75 | 5 | 5 | v. light | moderate |
| F | 75 | 5 | 10 | clean | v. light |
| G | 75 | 5 | 20 | clean | clean |
| H | 75 | 5 | 25 | light | v. light |
| I | 100 | 5 | — | moderate/heavy | light/moderate |
| J | 100 | 5 | 5 | clean | clean |

*Treatment components:
AA/AHPSE: Molar ratio of 3/1
HEDP: Dequest 2010, Monsanto Corp.
PEG: Number average molecular weight = 8,000

These data reflect the synergism that exists when the three components of the present invention are combined for the purpose of controlling silica deposition in select water systems. As is evident from Table I, dosages of each component may be varied in order to optimize process treatment. For example, clean surfaces result from as little as 75 ppm of polymer but only when the PEG component is between 10 and 20 ppm. If it is desired to keep PEG concentration to a minimum, then more polymer is required. Under the specific conditions above, in order to achieve clean surfaces with reduced PEG content, 100 ppm of polymer is required.

Ancillary tests were conducted to confirm the superior performance achieved by the present invention. The following tables represent comparative data compiled on different polymers, different molecular weight components and other additives.

Table II shows the effect that different molecular weight PEG molecules have on preventing silica deposition under the above noted test conditions. It appears that varying this parameter has little overall effect.

TABLE II
SILICA INHIBITION
Treatment (ppm)

| AA/AHPSE (active) | HEDP | PEG (Mol. Wt.) | Deposition 150° F. | 50° F. |
|---|---|---|---|---|
| 75 | 5 | 10 (2,000) | Light | very light |
| 75 | 5 | 10 (10,000) | very light | very light |
| 75 | 5 | 10 (20,000) | very light | very light |

Table III provides data on the effects additives other than those specifically claimed hereinafter have on silica deposition when combined with the AA/AHPSE copolymer.

TABLE III
SILICA INHIBITION
Treatment (ppm)

| Sample | AA/AHPSE (active) | Other Additives* | Deposition 150° F. | 50° F. |
|---|---|---|---|---|
| A | 50 | 5 ppm PBSAM | moderate | heavy |
| B | 100 | 5 ppm PBSAM | heavy | moderate |
| C | 100 | 5 ppm AMP | heavy | heavy light |
| D | 100 | 5 ppm AMP 5 ppm PEG (8,000 M.W.) | heavy | heavy light |
| E | 100 | 5 ppm HEDP 5 ppm surfactants 1 & 2 | moderate | v. light |
| F | 100 | 5 ppm HEDP 10 ppm surfactants 1 & 2 | clean | light |
| G | 100 | 5 ppm HEDP 5 ppm surfactant 1 | light | moderate |
| H | 100 | 5 ppm HEDP 10 ppm surfactant 1 | light | moderate |
| I | 100 | 5 ppm HEDP 5 ppm PEI 5 ppm surfacants 1 & 2 | clean | heavy |
| J | 100 | 5 ppm HEDP 5 ppm PEI | light | heavy |
| K | 75 | 5 ppm HEDP 5 ppm PEG (8,000 M.W.) 5 ppm surfactant 2 | moderate | v. light |
| L | 75 | 5 ppm HEDP 10 ppm PEG (8,000 M.W.) 1 ppm PEI | v. light | v. light |
| M | 75 | 5 ppm HEDP 10 ppm PEG (8,000 M.W.) 5 ppm PEI | clean | moderate |

*Other Additives:
PBSAM: 2-phosphonobutane-1,2,4-tricarboxylic acid (Mobay Bayhibit AM)
AMP: aminotri(methylene phosphonic acid) (Monsanto Dequest 2000)
Surfactant 1: propylene oxide/ethylene oxide block copolymers, 20% EO (BASF Pluronic F-108)
Surfactant 2: propylene oxide/ethylene oxide block copolymers, 80% EO (BASF Pluronic L-62)
PEI: polyethyleneimine (Aldrich)

The next set of data compares the efficacy of different polymers under the test conditions defined above. Some deposition is present in each sample shown below in Table IV which, when compared to samples G & J of Table I, underscores the unexpected superior results obtained by using the copolymer of the present invention.

TABLE IV
SILICA INHIBITION
Treatment (ppm)

| Sample | Polymer* (active) | HEDP | PEG (8,000 M.W.) | Deposition 150° F. | 50° F. |
|---|---|---|---|---|---|
| A | low MW AA/AHPSE (100 ppm) | 5 | 5 | moderate | light |
| B | 3/1 AA/AOP (100 ppm) | 5 | 5 | v. light | v. light |
| C | 6/1 AA/AOP (100 ppm) | 5 | 5 | moderate | light |
| D | 1/1 MA/AHPSE (75 ppm) | 5 | 10 | v. light | v. light |
| E | acrylic acid (100 ppm) | 5 | 5 | v. light | v. light |
| F | acrylic acid (100 ppm) | 5 | 5 | v. light | v. light |
| G | acrylic acid (100 ppm) | 5 | 10 | v. light | v. light |
| H | acrylic acid (100 ppm) | 5 | (5: surfactants 1 & 2) | v. light | light |

*polymers:
AA/AOP: acrylic acid/1-allyloxy-2-propanol
MA/AHPSE: methacrylic acid/allylhydroxy propyl sulfonate ether
acrylic acid: terpolymer, available from Rohm & Haas (Acrysol WTP-1) or Goodrich (Goodrite K-797 or KXP-165)

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A method for inhibiting deposition of silica on the internal surfaces of a structure which houses an aqueous medium comprising adding to said aqueous medium hydroxyethylidenediphosphonic acid, polyethylene glycol and a water soluble polymer having repeat units (a) and (b) of the structure:

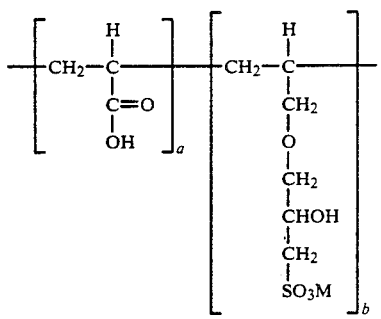

wherein M is a water soluble cation, the molar ratio of the repeat units a:b of said polymer being between about 30:1 to 1:20, the number average molecular weight of said polymer being between 1,000 and 1,000,000 and wherein the concentration of water soluble polymer: hydroxyethylidene diphosphonic acid: polyethyleneglycol is in the range of 0.1-500 ppm:1-100 ppm: 1-100 ppm.

2. The method according to claim 1 wherein the molar ratio of said repeat units a:b is from about 10:1 to 1:5.

3. The method according to claim 1 wherein the molar ratio of said repeat units a:b is about 3:1.

4. The method according to claim 1 wherein said aqueous medium is a cooling water system.

5. The method according to claim 1 wherein said aqueous medium is a steam generating system.

* * * * *